United States Patent [19]

Takahashi et al.

[11] Patent Number: 5,322,891
[45] Date of Patent: Jun. 21, 1994

[54] HIGHLY TRANSPARENT SILICONE FLUID COMPOUND

[75] Inventors: Takayuki Takahashi, Myogi; Satoshi Kuwata, Annaka, both of Japan

[73] Assignee: Shin-Etsu Chemical Co., Ltd., Tokyo, Japan

[21] Appl. No.: 31,020

[22] Filed: Mar. 11, 1993

Related U.S. Application Data

[63] Continuation of Ser. No. 761,240, Sep. 17, 1991, abandoned.

[30] Foreign Application Priority Data

Sep. 17, 1990 [JP] Japan ................. 2-246843

[51] Int. Cl.$^5$ ................................. C08K 3/00
[52] U.S. Cl. ................................. 524/841; 524/860; 524/863; 524/588; 252/21; 252/28; 252/582
[58] Field of Search .............. 524/847, 860, 863, 588; 252/21, 28, 582

[56] References Cited

U.S. PATENT DOCUMENTS

| | | | |
|---|---|---|---|
| 4,064,096 | 12/1977 | Gibard | 524/847 |
| 4,101,499 | 7/1978 | Herzig | 524/847 |
| 4,116,919 | 9/1978 | Elias et al. | 524/847 |
| 4,384,068 | 5/1983 | Bouverot et al. | 524/847 |
| 4,404,305 | 9/1983 | Gutek | 524/847 |
| 4,701,272 | 10/1987 | Mori et al. | 252/28 |

Primary Examiner—Ralph H. Dean
Assistant Examiner—Karen A. Dean
Attorney, Agent, or Firm—Oblon, Spivak, McClelland, Maier & Neustadt

[57] ABSTRACT

A highly transparent silicone paste composition is formulated by mixing:

(a) 100 parts by weight of a long chain alkyl-modified silicone fluid having a viscosity of 50–5,000 cS at 25° C. represented by the formula

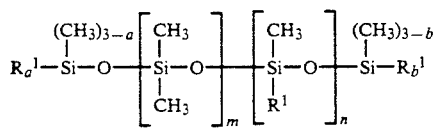

wherein $R^1$ is a monovalent saturated straight chain hydrocarbon group having 4–18 carbon atoms and accounts for 10–50 mol % of all the Si substituents; m and n are integers such that $0 \leq m \leq 500$, $5 \leq n \leq 500$, and $5 \leq m+n \leq 500$, and a and b are either 0 or 1;

(b) 1–30 weight parts of a fumed silica whose specific surface area is no less than 130 m$^2$/g; and (c) 0.1–20 weight parts of an alkoxysilane represented by the formula $X_c Si(CH_3)_d R^2_e$, wherein $R^2$ is an alkoxy group; X is selected from

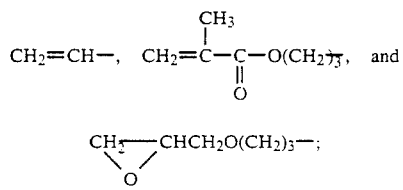

c is 0 or 1; d is 0, 1 or 2; e is 2 or 3; and $c+d+e=4$, or a hexamethyldisilazane represented by the formula $[(CH_3)_3Si]_2NH$.

12 Claims, No Drawings

HIGHLY TRANSPARENT SILICONE FLUID COMPOUND

This application is a continuation of application Ser. No. 07/761,240, filed on Sep. 17, 1991, now abandoned.

BACKGROUND OF THE INVENTION

1. Field of the Invention

The present invention relates to a highly transparent silicone fluid composition, and in particular to a highly transparent silicone fluid composition which has a light transmittance of 90% or greater when filled into a 10 mm-thick quartz cell and subjected to visible light of any wavelength, and is, therefore, useful in the production of articles such as optical fibers, optoelectronic products, optical instruments, etc.

2. Discussion of the Background

JP-A-50 64 354 teaches a transparent silicone fluid compound mainly composed of a methylphenylpolysiloxane and a fumed silica having similar refractive indices, and mixed with various additives such as oxyalkylenes and polyoxyalkylenes. Such silicone compounds may also contain $HO(CH_3C_6H_5SiO)_nH$ or a dimethylpolysiloxane and a silica whose surface is treated with an organosilicic compound such as $[(CH_3)_3Si]_2NH$.

JP-A-51 86 558 teaches a compound composed of a methylphenylpolysiloxane containing 29-34 wt. % phenyl groups, and additives such as an untreated fumed silica, an untreated precipitated silica, and a stabilizer. JP-A-2 45 561 teaches a compound composed of a methylphenylpolysiloxane containing 5-30 mol % phenyl groups, and additives such as a fumed silica whose specific surface area is no less than 130 m²/g, diphenyldialkoxysilane and diphenyldichlorosilane. JP-A-61 246 292 teaches a compound composed of a methylphenylpolysiloxane containing 5-20 mol % phenyl groups, additives such as a fumed silica whose specific surface area is no less than 130 m²/g, and an alkoxysilane containing either a double bond or an epoxy group.

Most of these known silicone fluid compositions contain methylphenylpolysiloxanes as the base material, are highly transparent and undergo minimal oil bleed. However, most of these compositions fail to exhibit a light transmittance of 90% or greater when filled into a 10 mm-thick quartz cell and subjected to visible light of certain wavelengths. The silicone fluid compound described in JP-A-61 246 292 undergoes virtually no oil bleed and has excellent light transmittance (greater than 90% in the case of 10 mm-thickness) and is, therefore, extensively used in optical fibers, optoelectronic products, optical instruments, scintillation camera, etc., and would be used as much in other applications if its cost were lower.

SUMMARY OF THE INVENTION

Therefore, it is an object of the invention to provide a novel silicone fluid compound which has a high transparency and a relatively low manufacturing cost.

According to the invention, a novel highly transparent silicone fluid compound is provided which attains this object. The composition of the invention is based on a long chain alkyl-modified silicone fluid, and characterized by comprising:

(a) 100 parts by weight of a silicone fluid having a viscosity of 50-5,000 cS at 25° C. and the structure

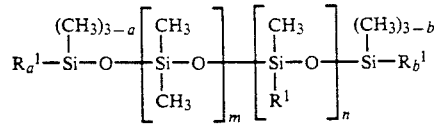

where $R^1$ is a monovalent saturated hydrocarbon group having 4-18 carbon atoms and accounts for 10-50 mol % of all the substituents on Si; m and n are integers such that $0 \leq m \leq 500$, $5 \leq n \leq 500$, and $5 \leq m+n \leq 500$, and a and b are either 0 or 1;

(b) 1-30 parts by weight of a fumed silica whose specific surface area is no less than 130 m²/g; and (c) 0.1-20 parts by weight of an alkoxysilane represented by the formula $X_cSi(CH_3)_dR^2_e$ where $R^2$ is an alkoxy group; X is selected from

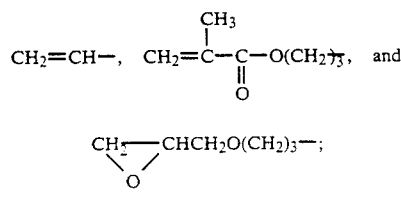

c is either 0 or 1; d is 0, 1 or 2; e is 2 or 3; and $c+d+e=4$, or a silazane represented by the formula $[(CH_3)_3Si]_2NH$.

It has been discovered that if a long chain alkyl-modified silicone fluid is used a the base fluid in place of methylphenylpolysiloxane, and if to this base fluid is added a fumed silica whose specific surface area is no less than 130 m²/g together with either an alkoxysilane defined above or a hexamethyldisilazane defined above, the resulting silicone fluid compound has a light transmittance of 90% or greater when filled into a 10 mm-thick quartz cell and subjected to visible light of any wavelength. The silicone fluid compound of the invention has a fluid or paste penetration and has such an excellent light transmittance that when it is used to fill gaps in an optical communication cable, the light loss at the joints is effectively reduced so that it is a superior material for long distance optical communication cables. Also, it has been confirmed that the present compound is an excellent material as a binder for optical lenses and especially for those used in a scintillation camera.

As described above, the present invention is a highly transparent silicone fluid compound based on a long chain alkyl-modified silicone fluid comprising the three essential components (a), (b) and (c).

Component (a), which is a modified silicone fluid and represented by the formula

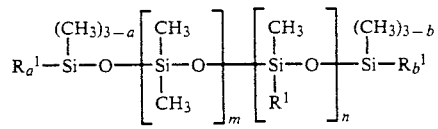

where $R^1$ is a monovalent saturated hydrocarbon group having 4-18 carbon atoms, preferably 6-16 carbon atoms, and accounts for 10-50 mol % of all the substituents on Si; m and n are integers such that $0 \leq m \leq 500$, $5 \leq n \leq 500$, and $5 \leq m+n \leq 500$, and a and b are either 0 or 1, must have a viscosity of 50–5,000 cS at 25° C. If the viscosity at the temperature is lower than 50 cS, the resulting silicone fluid compound will be unstable; if higher than 5,000 cS, the manufacturing will be very difficult.

The modified silicone fluid of component (a) is prepared by reacting a methylhydrogenpolysiloxane, which has hydrogen and methyl substituents on the silicon atoms, with an olefinic hydrocarbon having the formula $CH_2=CHY$ where Y is a saturated alkyl group having 2–16 carbon atoms, in the presence of an addition reaction catalyst, for example a platinic catalyst. Additional reaction process parameters, suitable starting materials and workup procedures are described, for example, in U.S. Pat. No. 3,885,984. Examples of suitable platinic catalysts are disclosed, for example, in U.S. Pat. No. 2,970,150, U.S. Pat. No. 2,823,218 and U.S. Pat. No. 3,220,972. These references are incorporated herein by reference for a more complete description of the procedure for preparing component (a).

Component (b), a fumed silica, may be any commercially available silica, but its specific surface area must be 130 m²/g or greater, for if the specific surface area is too small the transparency of the resulting compound will be poor. A preferred range of the specific surface area of the fumed silica as the component (b) is from 130 to 400 m²/g. If the amount of the fumed silica (b) is less than one part by weight per 100 parts by weight of component (a), it is difficult to produce a paste composition, and if it is greater than 30 parts by weight, the resulting grease is too sticky to enable smooth handling. A preferred range for the amount of component (b) is from 5 to 20 parts by weight.

Component (c) is either an alkoxysilane or hexamethylsilazane, i.e., $[(CH_3)_3Si]_2NH$. Alkoxysilane (c) is represented by the formula $X_cSi(CH_3)_dR^2_e$ where $R^2$ is an alkoxy group having 1–6 carbon atoms such as methoxy, ethyoxy, or 2-methoxyethoxy; X is a group selected from

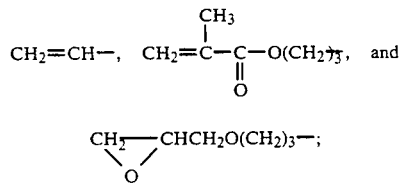

c is either 0 or 1; d is 0, 1 or 2; e is 2 or 3; and $c+d+e=4$. Examples of suitable alkoxysilanes include:

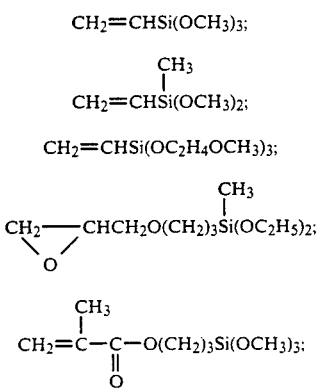

-continued
$(CH_3)_2Si(OC_2H_5)_2$; and $(CH_3)_2Si(OCH_3)_2$.

The alkoxysilanes of component (c) are well known in the art. The alkoxysilanes of component (c) may be prepared by reacting an organohalosilane, for example, an organochlorosilane $(X_cSi(CH_3)_dCl_e)$ with an alcohol or a metal alkoxide. This reaction is preferably conducted in the presence of a compound which can neutralize the hydrogenhalide (HCl) produced, for example pyridine. Suitable reaction parameters are described, for example, R. Nagel et al, J. O. C., 16:1768 (1951).

The alkoxysilane and the hexamethyldisilazane as the alternatives for the component (c) are used to adjust the visible light transmittance of the silicone fluid compound made from the modified silicone fluid and the fumed silica. If the amount of component (c) is less than 0.1 part by weight per 100 parts by weight of the silicone fluid (a), the desired object is not obtained, and if the amount exceeds 20 parts by weight, no extra effect is obtained. Thus, the amount of component (c) must be from 0.1 to 20 parts by weight, or preferably from 0.5 to 10 parts by weight.

The highly transparent silicone fluid compound of the present invention is obtained by simply mixing components (a), (b) and (c) in the respective predetermined amounts by means of a mixer such as a planetary mixer. In some cases, a more favorable result is attained if the components are mixed under a reduced pressure (10–300 mmHg) and at an elevated temperature (50°–150° C.), and thereafter kneaded with a three-roll mill followed by deaeration of the mixture. It is also preferred that the alkoxysilane or hexamethyldisilazane as component (c) be mixed with the fumed silica (b) and heated to a temperature of from 50° to 200° C. before addition of component (a), followed by further mixing. So long as it does not deduct from the achievement of the object of the invention, it is acceptable to add to the novel silicone fluid compound an agent to decrease flowability such as polyoxyethylene, polyoxypropylene or a copolymer of these for the purpose of adjusting the consistency.

Other features of the invention will become apparent in the course of the following descriptions of exemplary embodiments which are given for illustration of the invention but are not intended to be limiting thereof.

EXAMPLES

In the following examples, the term "part(s)" will be used for "part(s) by weight" for simplicity; the values of the viscosity are all taken at 25° C.; the values of the penetration are measured at 25° C. in accordance with JIS K2220; the values of visible light transmittance are taken with respect to light having a wavelength of from 400 to 700 nm.

EXAMPLE 1 AND COMPARATIVE EXAMPLE 1

One hundred parts of a long chain alkyl-modified silicone fluid which contained straight-chain alkyl groups having 14 carbon atoms in an amount of 37.5 mol %, a viscosity of 400 cS, and a structure represented by the formula

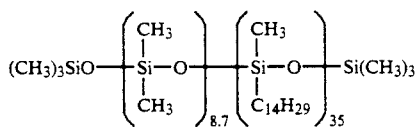

were mixed with 11 parts of a fumed silica (Aerosil 200, manufactured by Nippon Aerosil Co., Ltd.), which had a specific surface area of 200 m²/g, and 3.3 parts of dimethyldimethoxysilane. The mixture was mixed well in a planetary mixer and kneaded with a three-roll mill. Deaeration was then conducted under reduced pressure. A transparent silicone fluid compound was obtained, which was found to have a penetration of 320, and a visible light transmittance of 99.9-98% when filled into a 10 mm-thick quartz cell.

For the sake of comparison, a silicone fluid compound was prepared in exactly the same manner as in the above example except that the silicone fluid used was a dimethylsilicone fluid having a viscosity of 500 cS. The resulting silicone fluid compound was excessively soft having a penetration of only 430, and its visible light transmittance was only 32-34%.

EXAMPLE 2 AND COMPARATIVE EXAMPLE 2

One hundred parts of a long chain alkyl-modified silicone fluid which contained straight-chain alkyl groups having 10 carbon atoms in an amount of 25 mol %, a viscosity of 2,000 cS, and a structure represented by the formula

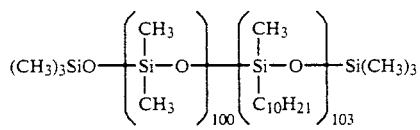

was mixed with 20 parts of a fumed silica (Aerosil 130, manufactured by Nippon Aerosil Co., Ltd.), which had a specific surface area of 130 m²/g, and 2.4 parts of hexamethyldisilazane. The mixture was mixed well in a planetary mixer and kneaded with a three-roll mill. Deaeration was then conducted under reduced pressure. A transparent silicone fluid compound was obtained, which was found to have a penetration of 320, and a visible light transmittance of 99.9-98% When filled into a 10 mm-thick quartz cell.

For comparison, a silicone fluid compound was prepared in exactly the same manner as in Example 2 except that the silicone fluid used was a dimethylsilicone fluid having a viscosity of 2,000 cS. The resulting silicone fluid compound had a penetration of 364, and its visible light transmittance was 24-84%.

EXAMPLE 3 AND COMPARATIVE EXAMPLE 3

A mixture consisting of one hundred parts of a fumed silica (Aerosil 380, manufactured by Nippon Aerosil Co., Ltd.), which had a specific surface area of 380 m²/g, and 30 parts of vinyltrimethoxysilane was heat-treated at 150° C. for four hours.

Ten parts of this mixture was added to one hundred parts of a long chain alkyl-modified silicone fluid which contained straight-chain alkyl groups having 8 carbon atoms in an amount of 25 mol %, a visosity of 100 cS, and a structure represented by the formula

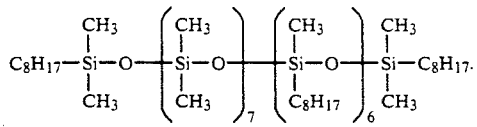

The mixture was mixed well in a planetary mixer and kneaded with a three-roll mill. Deaeration was then conducted under reduced pressure. A transparent silicone fluid compound was obtained, which was found to have a penetration of 310, and a visible light transmittance of 97-90% when filled into a 10 mm-thick quartz cell.

For comparison, a silicone fluid compound was prepared in exactly the same manner as in Example 3 except that the silicone fluid used was a dimethylsilicone fluid having a viscosity of 100 cS. The resulting silicone fluid compound had a penetration of 306, and its visible light transmittance was only 0-2.5%.

EXAMPLE 4 AND COMPARATIVE EXAMPLE 4

One hundred parts of a long chain alkyl-modified silicone fluid which contained straight-chain alkyl groups having 10 carbon atoms in an amount of 15 mol %, a viscosity of 160 cS, and a structure represented by the formula

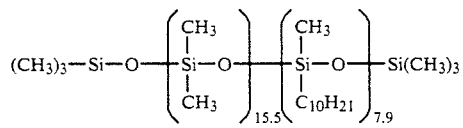

was mixed with 12 parts of a fumed silica (Aerosil 130) which had a specific surface area of 130 m²/g, and 10.8 parts of γ-methacryloxypropyltrimethoxysilane represented by the formula

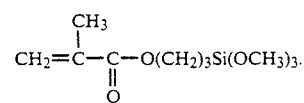

The mixture was mixed well in a planetary mixer and kneaded with a three-roll mill. Deaeration was then conducted under reduced pressure. A transparent silicone fluid compound was obtained, which was found to have a penetration of 300, and a visible light transmittance of 99.0- 97% when filled into a 10 mm-thick quartz cell.

For comparison, a silicone fluid compound was prepared in exactly the same manner as in Example 4 except that the γ-methacryloxypropyltrimethoxysilane was not added. The resulting silicone fluid compound was sticky having a penetration of only 202, and its visible light transmittance was only 35-66%.

EXAMPLE 5 AND COMPARATIVE EXAMPLE 5

One hundred parts of a long chain alkyl-modified silicone fluid which contained straight-chain alkyl groups having 8 carbon atoms in an amount of 44 mol %, a viscosity of 100 cS, and a structure represented by the formula

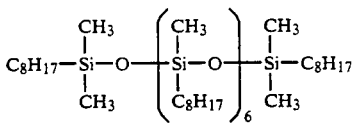

was mixed with 15 parts of a fumed silica (Aerosil 200) which had a specific surface area of 200 m²/g, and 2 parts of γ-glycidoxypropyldiethoxysilane represented by the formula

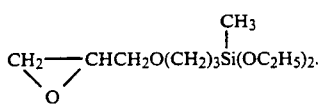

The mixture was mixed well in a planetary mixer and kneaded with a three-roll mill. Deaeration was then conducted under reduced pressure. A transparent silicone fluid compound was obtained, which was found to have a penetration of 250, and a visible light transmittance of 99.0-91% when filled into a 10 mm-thick quartz cell.

For comparison, a silicone fluid compound was prepared in exactly the same manner as in Example 5 except that the γ-glycidoxypropyldiethoxysilane was not added. The resulting silicone fluid compound was so sticky as to have a penetration of only 150, and its visible light transmittance was only 29-54%.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A highly transparent silicone paste composition, comprising a mixture of:
   (a) 100 parts by weight of a long chain alkyl-modified silicone fluid having a viscosity of 50–5,000 cS at 25° C. and the structure

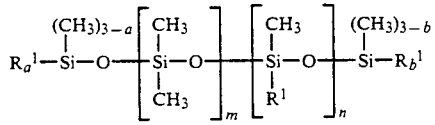

wherein $R^1$ is a monovalent saturated straight chain hydrocarbon group having 8–18 carbon atoms and accounts for 10–50 mol % of all substituents on Si; m and n are integers such that $0 \leq m \leq 500$, $5 \leq n \leq 500$, and $5 \leq m+n \leq 500$, and a and b are either 0 or 1;
   (b) 1–30 parts by weight of a fumed silica whose specific surface area is no less than 130 m²/g; and
   (c) 0.1–20 parts by weight of an alkoxysilane of the formula $X_c Si(CH_3)_d R^2_e$, wherein $R^2$ is an alkoxy group; X is selected from the group consisting of

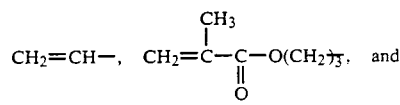

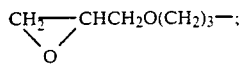

c is 0 or 1; d is 0, 1 or 2; e is 2 or 3; and $c+d+e=4$, or hexamethyldisilazane.

2. The composition of claim 1, wherein said fumed silica has a specific surface area of from 130 to 400 m²/g.

3. The composition of claim 1, wherein said composition comprises 5–20 parts by weight of said fumed silica.

4. The composition of claim 1, wherein said composition comprises 0.5–10 parts by weight of said alkoxysilane or hexamethyldisilazane.

5. The composition of claim 1, wherein $R^2$ is a $C_{1-6}$ alkoxy group.

6. The composition of claim 1, wherein $R^1$ is a monovalent saturated hydrocarbon group having 8–16 carbon atoms.

7. A highly transparent silicone paste composition, comprising a mixture of:
   (a) 100 parts by weight of a long chain alkyl-modified silicone fluid having a viscosity of 50–5,000 cS at 25° C. and the structure

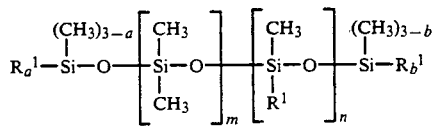

wherein $R^1$ is a monovalent saturated straight chain hydrocarbon group having 8–18 carbon atoms and accounts for 10–50 mol % of all substituents on Si; m and n are integers such that $0 \leq m \leq 500$, $5 \leq n \leq 500$, and $5 \leq m+n \leq 500$, and a and b are either 0 or 1;
   (b) 1–30 parts by weight of a fumed silica whose specific surface area is no less than 130 m²/g; and
   (c) 0.1–20 parts by weight of an alkoxysilane of the formula $X_c Si(CH_3)_d R^2_e$, wherein $R^2$ is an alkoxy group; X is selected from the group consisting of

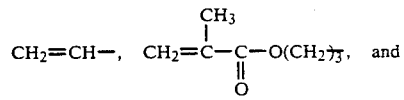

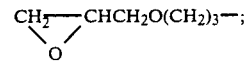

c is 0 or 1; d is 0, 1 or 2; e is 2 or 3; and $c+d+e=4$, or hexamethyldisilazane,
   wherein said composition is prepared by mixing components (b) and (c) and heating said mixture to a temperature of 50°–200° C. followed by addition of component (a).

8. The composition of claim 7, wherein said heating step is conducted at 50°–150° C. and a pressure of 10–300 mmHg.

9. The composition of claim 1, wherein $R^1$ is a monovalent saturated straight-chain hydrocarbon group having 8–14 carbon atoms.

10. The composition of claim 1, wherein said composition consists essentially of said long-chain alkyl modified silicone fluid (a), said fumed silica (b) and said alkoxysilane or hexamethyldisilazine (c).

11. The composition of claim 7, wherein $R^1$ is a monovalent saturated straight-chain hydrocarbon group having 8–14 carbon atoms.

12. The composition of claim 7, wherein said composition consists essentially of said long-chain alkyl-modified silicone fluid (a), said fumed silica (b) and said alkoxysilane or hexamethyldisilazine (c).

* * * * *